(12) United States Patent
Padaki et al.

(10) Patent No.: US 8,832,171 B2
(45) Date of Patent: Sep. 9, 2014

(54) INDEX GENERATION SCHEME FOR PRIME FACTOR ALGORITHM BASED MIXED RADIX DISCRETE FOURIER TRANSFORM (DFT)

(75) Inventors: Gururaj Padaki, Karnataka (IN); Saurabh Mishra, Bihar (IN); Suman Sanisetty, Karnataka (IN)

(73) Assignee: Saankhya Labs Pvt. Ltd., Bangalore, Karnataka (IN)

( * ) Notice: Subject to any disclaimer, the term of this patent is extended or adjusted under 35 U.S.C. 154(b) by 389 days.

(21) Appl. No.: 13/435,073

(22) Filed: Mar. 30, 2012

(65) Prior Publication Data

US 2012/0254274 A1    Oct. 4, 2012

(30) Foreign Application Priority Data

Mar. 31, 2011    (IN) ............... 1083/CHE/2011

(51) Int. Cl.
*G06F 17/14*    (2006.01)
(52) U.S. Cl.
CPC ................. *G06F 17/144* (2013.01)
USPC ........................................... 708/405
(58) Field of Classification Search
None
See application file for complete search history.

(56) References Cited

U.S. PATENT DOCUMENTS

| | | | | |
|---|---|---|---|---|
| 4,587,626 A | * | 5/1986 | Gray | 708/405 |
| 4,602,350 A | * | 7/1986 | Gray | 711/220 |
| 4,604,721 A | * | 8/1986 | Gray | 708/405 |
| 6,792,441 B2 | | 9/2004 | Jaber | |
| 2007/0291641 A1 | * | 12/2007 | Pan et al. | 370/210 |
| 2011/0099216 A1 | | 4/2011 | Sun et al. | |
| 2012/0254274 A1 | * | 10/2012 | Padaki et al. | 708/405 |

FOREIGN PATENT DOCUMENTS

EP    1750206 A1    2/2007

* cited by examiner

*Primary Examiner* — David H Malzahn
(74) *Attorney, Agent, or Firm* — Mendelsohn, Drucker & Dunleavy, P.C.; Steve Mendelsohn

(57) ABSTRACT

In one embodiment, a processor performs a method of generating pipelined data read indexes and data write indexes for a Prime Factor Algorithm (PFA) Discrete Fourier Transform (DFT) without look-up tables. The processor is adapted to factorize an 'N' point PFA DFT into one or more mutually prime factors and zero or more non-prime factors, calculate a 0th column index for an ith row (Xi0), calculate an IndCor when the value of Xi0 equals zero and when a row number (i) does not equal zero, calculate Xij, generate the data read indexes, perform a DFT kernel computation on Lk point for the mutually prime factors and the non-prime factors, and generate the data write indexes for the mutually prime factors and the non-prime factors. Xij represents ith row and jth column of 2D input Buffer and enables a selection of a linear index from the 2D input buffer.

12 Claims, 7 Drawing Sheets

| S/No | DTV Standard | Length of DFT |
|---|---|---|
| 1 | DVB-T | 2K/8K |
| 2 | ISDB-T | 2K/4K/8K |
| 3 | DMB-T | 3780 |

202 — DTV Standard column; 204 — Length of DFT column

| SL.NO | N | 3780 |
|---|---|---|
| 1 | PRIME FACTORS | 3X5X7X4 |
| 2 | NON-PRIME FACTORS | 3X3 |

FIG. 3

```
N Point DFT can be factorized as PFA and Non PFA factors
            N = L1 X L2... X Ln X M1 X M2...X Mm
    PFA Factors                    L = L1 X L2 X L3 ... X Ln
    Non PFA Factors                M = M1 X M2 X M3 ... X Mm Minimum Factor of N = Nmin =   Min( L1, L2,...Ln , M1,M2...Mm)
    k varies from                  0 to n
                    For Lk point PFA DFT
    Index Correction = IndCor =    0
    Number of Lk DFT's for kth stage        N/Lk
    Column increment index of kth stage= Cincr    N/Lk
    Row index "i" varies from      0 to N/Lk
    Column index "j" varies from   0 to Lk
    Xi0=                           (i*Lk*M)%N
if (i != 0) & (Xi0 == 0)
    {
    IndCor =                       (IndCor + Nmin)%(M-1)
    }
if (j == 0 )
    {
    Xi0 =                          Xi0 + IndCor
    }
    else
    {
    Xij =                          (Xi(j-1) + Cincr)%N
    }
```

FIG. 4

INDEX GENERATION SCHEME FOR PRIME FACTOR ALGORITHM BASED MIXED RADIX DISCRETE FOURIER TRANSFORM (DFT)

BACKGROUND

1. Technical Field

The embodiments herein generally relate to an index generation scheme for communication receivers, and, more particularly, to the generation of input/output indexes for prime factor Discrete Fourier Transform (DFT) without the need for additional memory for reordering blocks.

2. Description of the Related Art

The Discrete Fourier transform (DFT) is a powerful tool for many signal processing algorithms. In orthogonal frequency division multiplexing (OFDM) based modulation schemes for wireless data transmission, Inverse Discrete Fourier transform (IDFT)/Discrete Fourier transform (DFT) is used as a transformation tool. With advancement in OFDM modulation, different transmission standards use a different length of DFT to get an optimal performance in data transmission. For an example, the digital television standards use different sizes of DFT length for modulation (e.g., length of DFT for DVB-T standard is 2K/8K, length of DFT for ISDB-T standard is 2K/4K/8K, and length of DFT for DMB-T standard is 3780).

FIG. 1 illustrates a generic diagram of a Discrete Fourier transform (DFT) with Prime factor algorithm (PFA) 102 and non PFA 104. An N point DFT can be factorized into smaller size DFTs. Factors are grouped into one or more mutually prime factors 102 and zero or more non-prime factors 104. One of the efficient methods of implementing non prime factor DFTs 104 is using the Cooley-Tukey Fast Fourier transform (FFT). Prime factor DFTs 102 are implemented using a PFA. Even though the computation efficiency of PFA DFTs 102 is comparable to a Cooley-Tukey FFT, one important disadvantage of a PFA is that it requires a complicated data input/output indexing mechanism.

FIG. 2 is a table view illustrating digital transmission standards of DFT. The table view includes a DTV standard field 202, and a length of DFT field 204. The DTV standard field 202 includes one or more DTV standards (e.g., DVB-T, ISDB-T, DMB-T). The length of DFT field 204 includes one or more lengths (e.g., 2K/8K for DVB-T, 2K/4K/8K for ISDB-T, and 3780 for DMB-T). Digital Multimedia Broadcast-Terrestrial Digital television (DMB-T DTV) transmission uses a 3780-point DFT, which is not an integer power of 2 and is difficult to implement but provides more system performance compared to a 4096-point DFT. Current solution uses a lookup table to store required input/output indexes per stage. This scheme requires extra memory to store the index lookup tables. Accordingly there remains a need of developing an efficient, high performance parameterization method to perform DFTs which are non-integer powers of 2.

SUMMARY

In view of the foregoing, an embodiment herein provides a processor to perform a method of generating one or more pipelined data read indexes and one or more pipelined data write indexes for a Prime Factor Algorithm (PFA) based mixed radix Discrete Fourier Transform (DFT) without using look-up tables and thus reducing (i) a memory requirement and (ii) cycle count in the CPU when implemented in a communication system. The processor is adapted to (1) factorize any 'N' point PFA DFT into one or more mutually prime factors (L=L1*L2* ... Ln) and zero or more non-prime factors (M=M1*M2* ... Mm), where "*" represents multiplication, (2) initialize an Nmin parameter to the smallest factor of all of the factors, (3) initialize an Index Correction (IndCor) to zero, (4) determine whether a value of 'k' is less than a value of 'n', and (5) determine whether a row number (i) of the PFA DFT is less than a Column increment index (Cincr) of the PFA DFT. 'k' is a variable and 'n' corresponds to the number of mutually prime factors. 'n' is the total number of mutually prime factors stages, and k is an index for the mutually prime factor stage, which varies from 0 to n−1.

In general, the value N representing the number of points (i.e., taps) of a DFT can be represented as a product of one or more mutually prime factors (L1, L2, ..., Ln) and zero or more non-prime factors (M1, M2, ..., Mm), where N=L1*L2* ... *Ln*M1*M2* ... *Mm. As used herein, the terms "mutually prime factors" and "prime factors" refer to the subset of mutually different factors of the value N, where each mutually prime factor does not have a factor (other than 1) in common with any other mutually prime factor, whether or not those mutually prime factors are themselves prime numbers. The term "non-prime factors" refers to the remaining factors of the value N, if any, that do have a factor (other than 1) in common with one of the mutually prime factors.

For example, the value N=3780 can be represented as N=2*2*3*3*3*5*7. In that case, the mutually prime factors would be {2, 3, 5, 7}, and the non-prime factors would be {2, 3, 3}. In this case, the factors {2, 3, 5, 7} are the mutually prime factors, because none of them has a factor in common with any of the other three. On the other hand, the factors {2, 3, 3} are the non-prime factors, because each of them has a factor in common with one of the mutually prime factors.

Alternatively, the value N=3780 can be represented as N=3*3*3*4*5*7. In that case, the mutually prime factors would be {3, 4, 5, 7}, and the non-prime factors would be {3, 3}.

As another example, the value N=3780 can be represented as N=2*2*3*5*7*9. In that case, the mutually prime factors could be {2, 5, 7, 9}, and the non-prime factors would then be {2, 3}, where the non-prime factor has the factor 2 in common with the mutually prime factor 2, and the non-prime factor 3 has the factor 3 in common with the mutually prime factor 9. Alternatively, for that same set of factors, the mutually prime factors could be {2, 3, 5, 7}, and the non-prime factors would then be {2, 9}, where the non-prime factor has the factor 2 in common with the mutually prime factor 2, and the non-prime factor 9 has the factor 3 in common with the mutually prime factor 3.

As yet another example, the value N=3780 can be represented as N=4*5*7*27. In that case, the mutually prime factors would be {4, 5, 7, 27}, and there would be no non-prime factors. Other factorizations of N=3780 with other corresponding subsets of mutually prime and non-prime factors are also possible.

The Column increment index (Cincr) equals N divided by Lk (N/Lk). Lk is 'k-th' mutually prime factor of the n mutually prime factors. The 0th column index Xi0 for an ith row of the PFA DFT is calculated in accordance with an equation: Xi0=(i*Lk*M)%N, where "%" represents the modulus operation. The processor is adapted to calculate an index correction (IndCor) of the PFA DFT when the value of Xi0 equals zero and when the row number (i) does not equal zero. IndCor is calculated to obtain a source mapping of linear indexes in accordance with an equation: IndCor=(IndCor+Nmin)%(M−1). Xij is calculated in accordance with an equation: Xij=Xij+IndCor. Xij represents the ith row and jth column of a 2-Dimensional (2D) input Buffer X and enables a selection of the linear index from the 2D input buffer. The processor is adapted to generate a plurality of data read indexes based on the mutually prime factors and the non-prime factors.

The plurality of data read indexes (i.e., input indexes) Xij are generated in accordance with an equation: $Xij=(Xi(j-1)+Cincr) \% N$. Each of the input indexes Xij is generated per stage to correspond to at least one of the mutually prime factors or at least one of the non-prime factors. A DFT kernel computation is performed using the plurality of data read indexes that are generated and obtained from an input buffer. The one or more data write indexes (i.e., output indexes) are generated for the mutually prime factors and the non-prime factors. The data write indexes are stored in an output buffer or an input buffer of a next stage. The processor is further adapted to (i) increment a value of 'j' when the Xij is calculated, (ii) determine whether the value of 'j' is less than the 'Lk', and (iii) increment the value of 'j when the plurality of data read indexes are generated. The value of 'M' is the multiplicative product of the non-prime factors.

In another aspect, a hardware accelerator having a set of instructions for faster generation of one or more pipelined data read indexes and one or more pipelined data write indexes for a Prime Factor Algorithm (PFA) based mixed radix Discrete Fourier Transform (DFT) without using look-up tables is provided. The instructions include (i) factorizing any 'N' point PFA DFT into one or more mutually prime factors and zero or more non-prime factors, (ii) initializing an Nmin parameter to the smallest factor of all of the factors, (iii) initializing an Index Correction (IndCor) to zero, (iv) determining whether a row number (i) of the PFA DFT is less than a Column increment index (Cincr) of the PFA DFT. The Column increment index (Cincr) equals N divided by Lk (N/Lk) and a 0th column index Xi0 for an ith row is calculated in accordance with an equation: $Xi0=(i*Lk*M)\%N$.

The instructions further include (i) calculating an index correction (IndCor) of the PFA DFT when the value of Xi0 equals zero and when the row number (i) does not equal zero. The IndCor is calculated in accordance with an equation: $IndCor=(IndCor+Nmin)\%(M-1)$. Xij is calculated in accordance with an equation: $Xij=Xij+IndCor$. The one or more data read indexes are generated based on the mutually prime factors and the non-prime factors in accordance with an equation: $Xij=(Xi(j-1)+Cincr)\%N$. The instructions further include (i) performing a DFT for each of the mutually prime factors and the non-prime factors using the one or more data read indexes that are generated and obtained from an input buffer, and (ii) generating the one or more data write indexes for the mutually prime factors and the non-prime factors. The instructions further include (i) incrementing a value of 'j' when the Xij is calculated, (ii) determining whether the value of 'j' is less than 'Lk', and (iii) incrementing the value of 'j when the one or more data read indexes are generated.

In yet another aspect, a general purpose processor to dynamically configure one or more DFT stages in a communication system is provided. The general purpose processor includes (i) a factorization unit that factorizes any N point DFT into one or more mutually prime factors and zero or more non-prime factors, (ii) a stage determination unit that determines one or more stages based on the mutually prime factors and the non-prime factors, and (iii) a stage configuration unit that dynamically configures the one or more stages based on the mutually prime factors and the non-prime factors of the N point DFT. The one or more stages include one or more PFA stages and zero or more non-PFA stages. The one or more PFA stages and the zero or more non-PFA stages are determined based on the N point DFT.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

These and other features, aspects, and advantages of the present embodiment will become better understood with regard to the following description, appended claims, and accompanying drawings, in which:

FIG. 3 is a table view illustrating the split between mutually prime factors and non-prime factors for a 3780 point Discrete Fourier transform (DFT) according to an embodiment herein;

FIG. 4 is a table view illustrating an input index generation of a prime factor algorithm Discrete Fourier Transform (PFA DFT) according to an embodiment herein;

DETAILED DESCRIPTION OF PREFERRED EMBODIMENTS

Figures 1, 2:
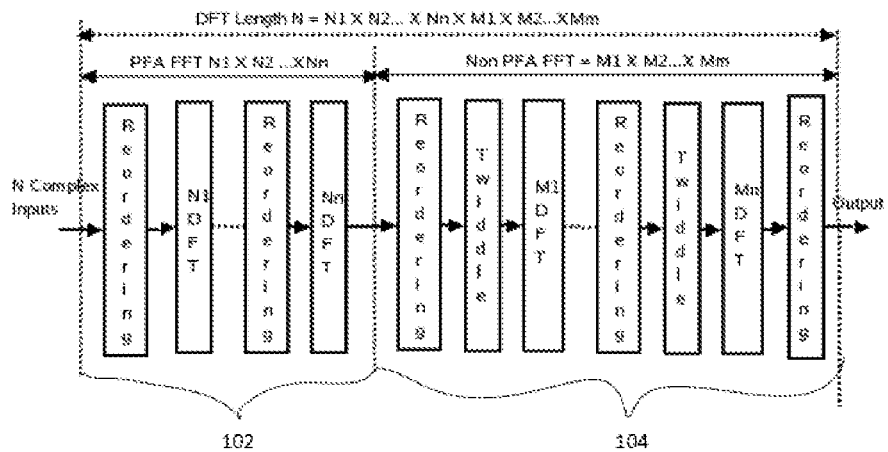
FIG. 1 illustrates a generic diagram of a Discrete Fourier transform (DFT) with a Prime factor algorithm (PFA) and non PFA.
FIG. 2 is a table view illustrating digital transmission standards of Discrete Fourier transform (DFT)

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need of developing an efficient, high performance parameterization method to perform DFTs which are a non-integer power of 2. The embodiments herein achieve this by providing a general purpose CPU/processor and/or a hardware accelerator. The processor generates pipelined data read indexes and data write indexes for a mutually Prime Factor Algorithm (PFA) Discrete Fourier Transform (DFT) without using look-up tables. The generation of the pipelined data read indexes and data write indexes for the Prime Factor Algorithm (PFA) Discrete Fourier Transform (DFT) includes (i) factorizing any 'N' point PFA DFT into one or more mutually prime factors and zero or more non-prime factors, (ii) calculating a 0th column index Xi0 for an ith row, (iii) calculating an IndCor when the value of Xi0 equals zero and when a row number (i) does not equal zero, (iv) calculating data read indexes Xij in accordance with an equation: Xij=Xij+IndCor, (v) generating the data read indexes Xij, (vi) performing a Lk point DFT of kth stage of the mutually prime factors and the non-prime factors, and (vii) generating the data write indexes for the mutually prime factors and the non-prime factors. Xij represents the ith row and jth column of a 2D input Buffer and enables a selection of a linear index from the 2D input buffer. Referring now to the drawings, and more particularly to FIGS. 3 through 10, where similar reference characters denote corresponding features consistently throughout the figures, there are shown preferred embodiments.

FIG. 3 is a table view illustrating one possible split between mutually prime factors and non-prime factors for a 3780 point Discrete Fourier transform (DFT) according to an embodiment herein. The table includes an N field 302, and 3780 points field 304. The 3780 point DFT is factorized into four mutually prime factors (3*5*7*4) and two non-prime factors (3*3). Input indexes are generated using a control code. In one embodiment, 3780 points is considered for an instance as an example.

FIG. 4 is a table view illustrating an input index generation of a prime factor algorithm Discrete Fourier Transform (PFA DFT) according to an embodiment herein. As shown in FIG. 4, any 'N' point DFT can be factorized as one or more mutually prime factors ($L=L_1*L_2*L_3 \ldots *L_n$) and zero or more non prime factors ($M=M_1*M_2*M_3 \ldots *M_m$). N equals the product of the factors ($L_1*L_2*L_3 \ldots *L_n*M_1*M_2*M_3 \ldots *M_m$). The minimum factor of N ($N_{min}$) is given as: $Min(L_1*L_2*L_3 \ldots *L_n*M_1*M_2*M_3 \ldots *M_m)$ and k varies from 0 to n. For an Lk point PFA DFT, a value of an Index correction (IndCor) is initialized to 0. In one embodiment, Nmin is initialized to the smallest factor.

The number of Lk-point DFTs for the kth stage equals N/Lk. To cover all N points for the kth stage, N/Lk Lk-point DFTs are performed. The column increment index for the kth stage (Cincr) equals N/Lk. Row index 'i' varies from 0 to N/Lk. Column index 'j' varies from 0 to Lk. The 0th column index Xi0 for the ith row is calculated in accordance with the following equation:

$$Xi0=(i*L_k*M)\%N \quad (1)$$

A new index correction (IndCor) is calculated in accordance with the following equation:

$$IndCor=(IndCor+Nmin)\%(M-1) \quad (2)$$

In one embodiment, the new IndCor is calculated when 'i' does not equal 0 and when Xi0 equals zero (i.e., if (i !=0)& (Xi0==0)).

Xi0 is calculated in accordance with the following equation:

$$Xi0=Xi0+IndCor \quad (3)$$

In one embodiment, Xi0 is calculated when the value of 'j' equals 0 (j==0). Else, jth column index is calculated in accordance with the following equation:

$$Xij=(Xi(j-1)+Cincr)\%N \quad (4)$$

These factors, in turn, are important for input indexes generation of Prime Factor Algorithm Discrete Fourier transform (PFA DFT).

Figure 5:
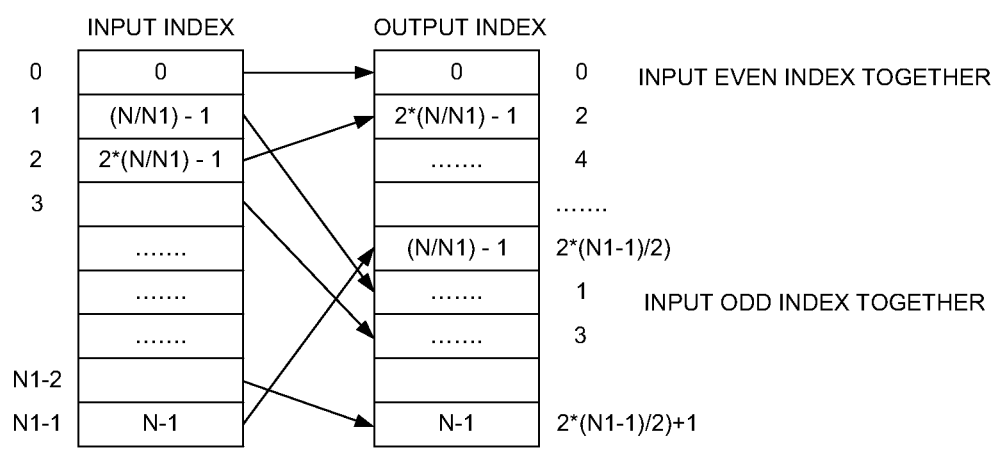
FIG. 5 illustrates an N1 point DFT output address mapping according to an embodiment herein.

FIG. 5 illustrates an N1 point DFT output address mapping according to an embodiment herein. The N1 point DFT output address mapping includes 1-Dimensional $L_k$ point DFT Input indexes and Output indexes. The 1-Dimensional Lk point DFT outputs are grouped into all even point inputs index together and all odd point inputs index together as shown in FIG. 5. The 1-Dimensional Lk point DFT Input index is generated using the control code illustrated in FIG. 4.

Figure 6:
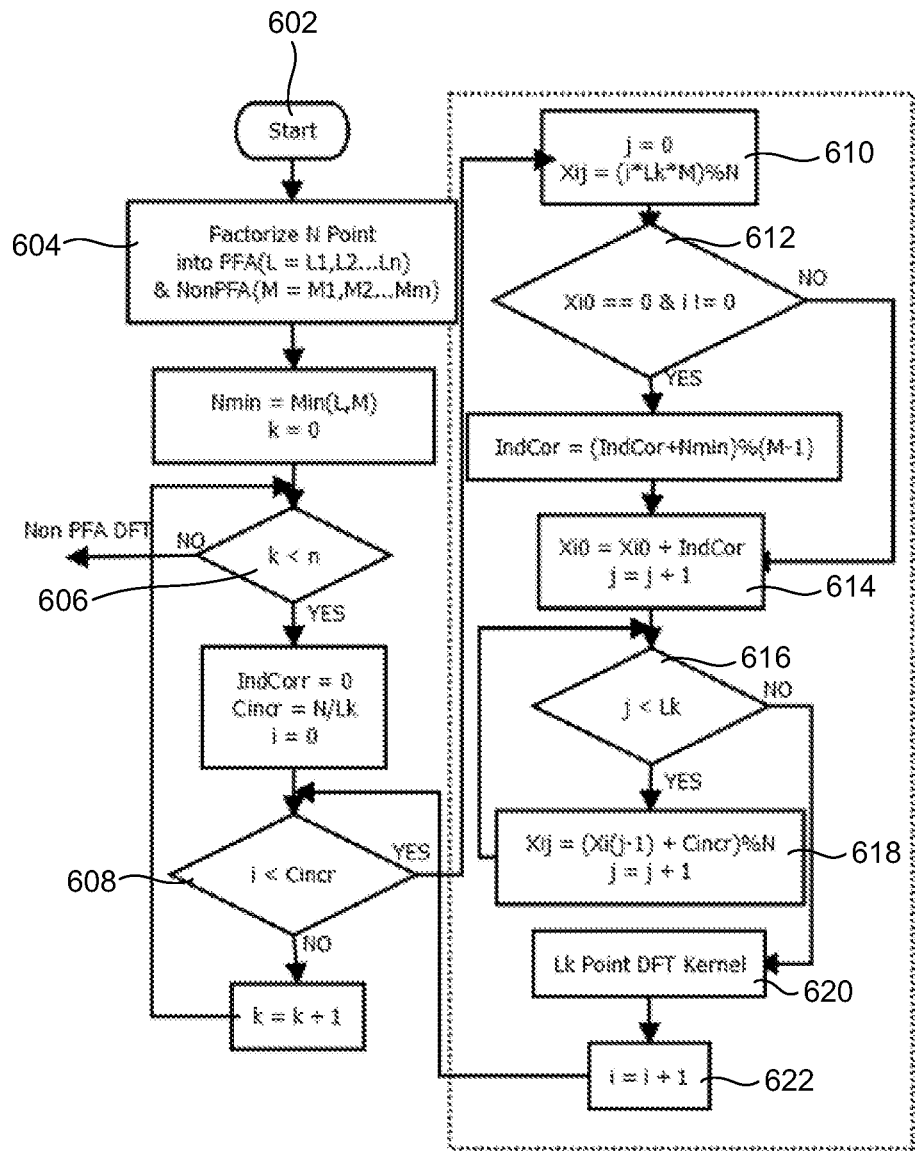
FIG. 6 is a flow chart illustrating a method of generating a Prime Factor Algorithm DFT index according to an embodiment herein.

FIG. 6 is a flow chart illustrating a method of generating a Prime Factor Algorithm DFT index according to an embodiment herein. The flow chart is pipelined along with prime factor DFT kernel computation in a Very Large Instruction Word (VLIW) processor, so that extra overhead for index generation is reduced. In one embodiment, only additions (ADD) and modulus (MOD) instructions/operations are required to implement index generation logic. In step 602, the DFT factorization is started and any N point DFT is factorized into the one or more mutually prime factors ($L=L_1*L_2*L_3 \ldots *L_n$) and the zero or more non-prime factors ($M=M_1*M_2*M_3 \ldots *M_m$) in step 604. The minimum factor of N (Nmin) equals Min (L1, L2, . . . , Ln, M1, M2, . . . , Mm) and the index 'k' is initialized to zero. In step 606, it is checked whether the value of 'k' is less than the value of 'n'. If the value of 'k' is less than the value of 'n', then the value of index correction IndCor and the value of the ith row index are initialized to 0 (i.e., IndCor=0, and i=0). A Column increment index for the kth stage (Cincr) is set equal to N/Lk (i.e., Cincr=N/Lk).

Else, if the value of 'k' is not less than the value of 'n' in step 606, a non-prime factor algorithm Discrete Fourier Transform (DFT) is performed. In one embodiment, 'k' is a variable and 'n' corresponds to the number of mutually prime factors. 'n' is the total number of mutually prime factors stages, and k is an index for the mutually prime factor stage, which varies from 0 to n−1. In step 608, it is checked whether the value of 'i' is less than the value of Vince. If the value of 'j' is not less than Cincr, then 'k' is incremented (i.e., k=k+1) and the step 606 is repeated. If the value of 'i' is less than the value of 'Cincr', then the value of 'j' is initialized to 0 (j=0), and Xij is calculated in step 610 in accordance with the equation:

$$Xij=(Xi(j-1)+Cincr)\%N$$

In step 612, it is checked whether (1) the value of 'i' does not equal 0 and (2) Xi0 equals zero (e.g., if (i!=0) & (Xi0==0)). If (i!=0) & (Xi0==0), then IndCor is calculated in accordance with the equation:

$$IndCor=(IndCor+Nmin)\%(M-1).$$

In one embodiment, the Index Correction is calculated to obtain a source mapping of linear indexes as shown in FIG. 5. After calculating IndCor, processing continues to step 614. If the above condition (if (i!=0) & (Xi0==0)) is not satisfied in step 612, then processing continues directly to step 614 without calculating IndCor. In step 614, Xi0 is calculated in accordance with the equation:

$$Xi0=Xi0+IndCor,$$

and the value of 'j' is incremented (i.e., j=j+1).

In one embodiment, Xij represents the ith row and jth column of a 2-Dimensional input Buffer X. Xij enables a selection of the linear index from the 2D input buffer. In step 616, it is checked whether the value of 'j' is less than the value of 'Lk' (j<$L_k$). If the value of 'j' is less than the value of 'Lk', then Xij value is calculated in accordance with the equation:

$$Xij=(Xi(j-1)+\text{Cincr})\%N,$$

and the value of j is incremented by 1 (j=j+1) in step 618 and the step 616 is repeated. If the value of 'j' is not less than the value of Lk in step 616, then Lk point DFT kernel is determined in step 620. In step 622, the value of 'i' is incremented (i=i+1) and the step 608 is repeated. In one embodiment, the scheme generates Input/Output indexes as and when required without any need for additional memory for reordering blocks and reduces the memory requirement by eliminating the need of lookup tables. In another embodiment, this scheme can be implemented as a hardware accelerator to generate one or more indexes for PFA DFT.

In yet another embodiment, this scheme also provides a pipeline index generation and DFT kernel computation, which reduces cycle count in a VLIW CPU implementation. Once the input indexes (e.g., pipelined data read indexes) are generated, then DFT kernel computation is performed on Lk point, and the output indexes (e.g., pipelined data write indexes) are generated. In one embodiment, a DFT kernel computation is performed for each of the mutually prime factors and each of the non-prime factors using the one or more data read indexes that are generated and obtained from the input buffer. Each of the input indexes that is generated per stage corresponds to at least one mutually prime factor or non-prime factor. The output indexes (e.g., the data write indexes) are stored in an output buffer or an input buffer of a next stage.

Figure 7:
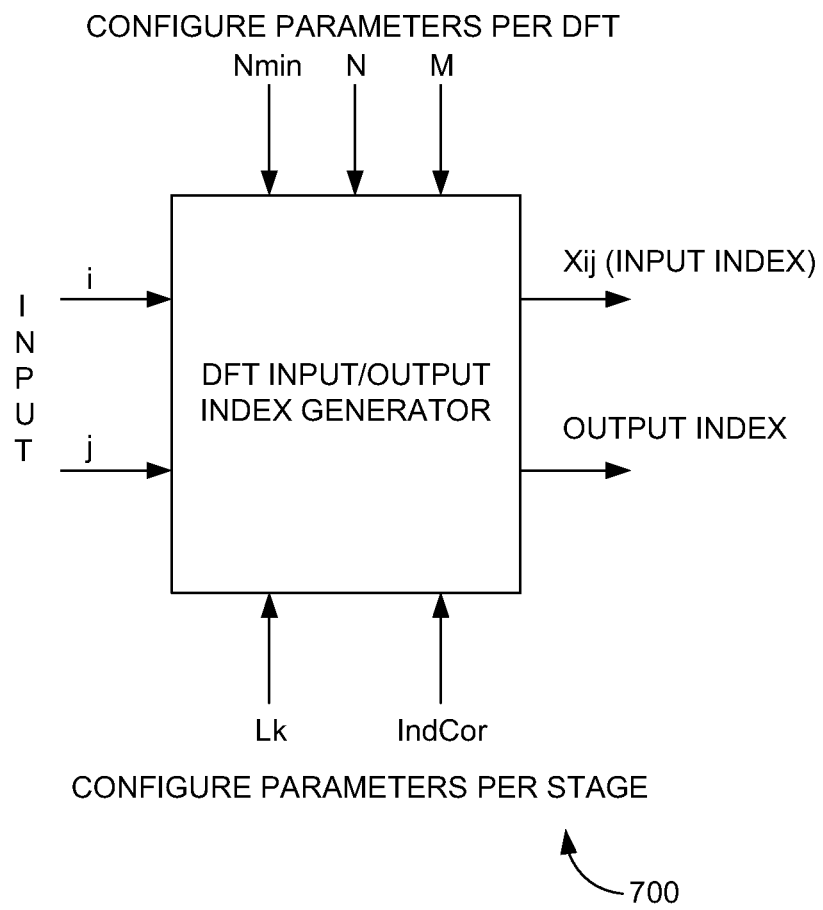
FIG. 7 is a general purpose hardware block that is implemented in a communication system (e.g., a transmitter or a receiver) to generate the data read indexes and the data write indexes according to an embodiment herein.

FIG. 7 is a general purpose hardware block 700 that is implemented in a communication system (e.g., a transmitter or a receiver) to generate the data read indexes and the data write indexes according to an embodiment herein. In one embodiment, the general purpose hardware block is a DFT input/output index generator. As shown in FIG. 7, the parameters Nmin, N, and M are configured per DFT. The parameters Lk and IndCor are configured per stage. Input values for the 'ith' row and 'jth' column of index are fed, and Xij (input index) is generated. After performing a DFT on the input indexes, the results are stored in output indexes that are generated.

Figure 8:
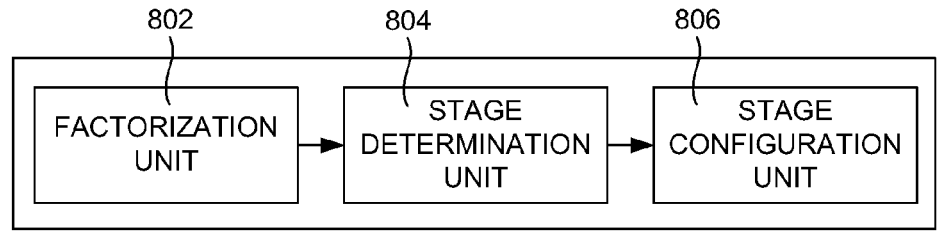
FIG. 8 is an exploded view of the general purpose hardware of FIG. 7 to dynamically configure one or more DFT stages in the communication system according to an embodiment herein.

With reference to FIG. 7, FIG. 8 is an exploded view of the general purpose hardware 700 of FIG. 7 to dynamically configure one or more DFT stages in the communication system according to an embodiment herein. In one embodiment, the general purpose hardware 700 is a general purpose processor. The general purpose processor 700 includes a factorization unit 802, a stage determination unit 804, and a stage configuration unit 806. The factorization unit 802 factorizes an N point DFT (e.g., where N is the length of the DFT) into one or more mutually prime factors and zero or more non-prime factors as shown in FIG. 3.

In one embodiment, any 'N' point DFT can be factorized into one or more mutually prime factors and zero or more non-prime factors. The stage determination unit 804 determines one or more stages based on the mutually prime factors and the non-prime factors. The stage configuration unit 806 dynamically configures the one or more stages based on the mutually prime factors and the non-prime factors of the 'N' point DFT. In one embodiment, the one or more stages include one or more PFA stages and zero and more Non-PFA stages. The one or more PFA stages and the zero or more Non-PFA stages are determined based on the 'N' point DFT.

Figure 9:
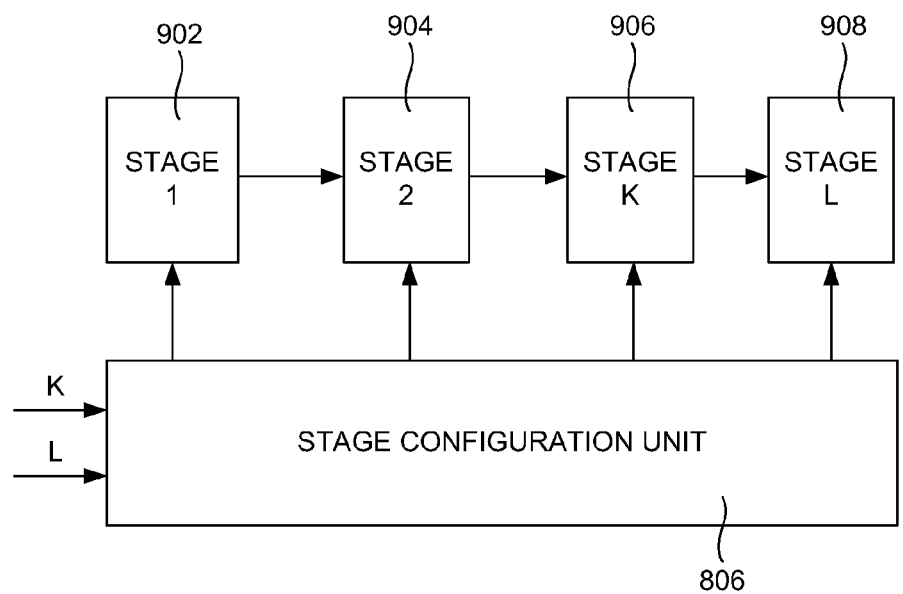
FIG. 9 illustrates a dynamic configuration of one or more stages 902-908 from PFA to Non-PFA according to an embodiment herein.

With reference to FIG. 7 and FIG. 8, FIG. 9 illustrates a dynamic configuration of one or more stages 902-908 from PFA to Non-PFA according to an embodiment herein. The values from the stages K and L (e.g., the stage 906 and the stage 908) are fed as input to the stage configuration unit 806 of FIG. 8 to configure the parameters Lk and IndCor as described above.

Figure 10:
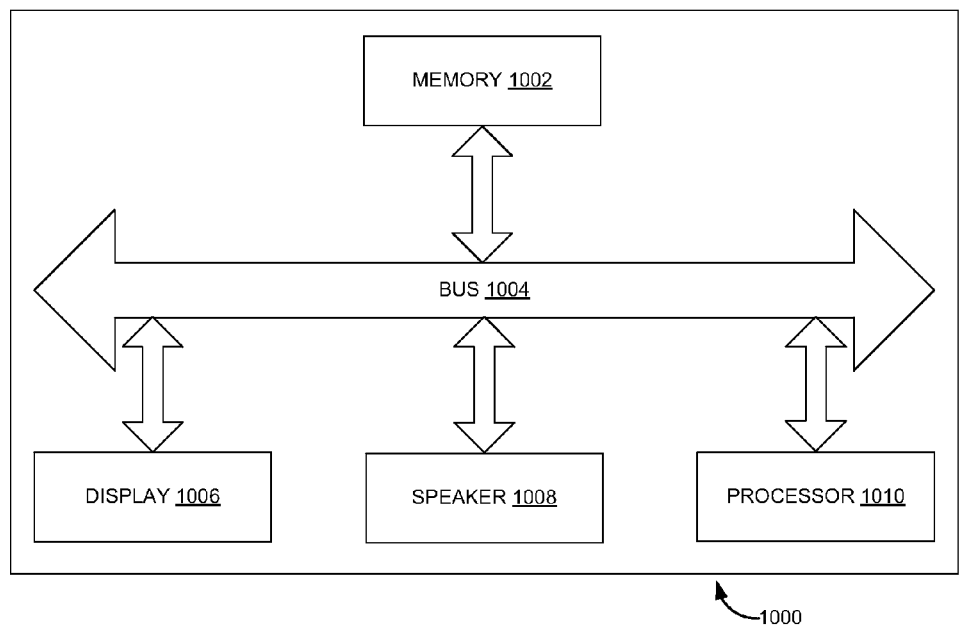
FIG. 10 illustrates an exploded view of a receiver including a memory having a set of computer instructions, a bus, a display, a speaker, and a processor capable of processing the set of computer instructions to perform any one or more of the methodologies herein, according to an embodiment herein.

FIG. 10 illustrates an exploded view of a receiver 1000 including a memory 1002 having a set of computer instructions, a bus 1004, a display 1006, a speaker 1008, and a processor 1010 capable of processing the set of computer instructions to perform any one or more of the methodologies herein, according to an embodiment herein. The processor 1010 may also enable digital content to be consumed in the form of video for output via one or more displays 1006 or audio for output via speaker and/or earphones 1008. The processor 1010 may also carry out the methods described herein and in accordance with the embodiments herein. Digital content may also be stored in the memory 1002 for future processing or consumption. The memory 1002 may also store program specific information and/or service information (PSI/SI), including information about digital content (e.g., the detected information bits) available in the future or stored from the past.

A user of the receiver 1000 may view this stored information on display 1006 and select an item for viewing, listening, or other uses via input, which may take the form of keypad, scroll, or other input device(s) or combinations thereof. When digital content is selected, the processor 1010 may pass information. The content and PSI/SI may be passed among functions within the receiver 1000 using bus 1004. In one embodiment, the processor 1010 is the general purpose hardware 700 of FIG. 7 that dynamically configures a plurality of DFT stages in the communication system (e.g., the receiver 1000). Further, the processor 1010 may be the same general purpose processor 700 that includes the factorization unit 802, the stage determination unit 804, and the stage configuration unit 806.

The processor 1010 can also be implemented in a transmitter system which includes a memory having a set of computer instructions, a bus, a display, a speaker. The processor 1010 in the transmitter system is also capable of processing a set of instructions to perform any one or more of the methodologies herein. Further the processor 1010 or the processor 700 is a general-purpose CPU that performs a method of generating one or more pipelined data read indexes and pipelined data write indexes for a Prime Factor Algorithm (PFA) based mixed radix Discrete Fourier Transform (DFT) without using look-up tables and thus reduces (i) a memory requirement and (ii) a cycle count in the CPU when implemented in a communication system (e.g., a receiver system or a transmitter system).

The same processor 700 or the processor 1010 can be implemented in any hardware accelerator that includes the set of computer instructions for faster generation of the one or more pipelined data read indexes (e.g., the input indexes or the data read indexes) and the one or more pipelined data write indexes (e.g., the output indexes or the data write indexes) for a Prime Factor Algorithm (PFA) based mixed radix Discrete Fourier Transform (DFT) without using look-up tables and thus reducing a memory requirement when implemented in any type of receivers and/or transmitters.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A machine configured to perform a method of generating a plurality of pipelined data read indexes and a plurality of pipelined data write indexes for Prime Factor Algorithm (PFA) based mixed radix Discrete Fourier Transform (DFT), said machine comprising:

means for factorizing an 'N' point PFA DFT into one or more mutually prime factors and zero or more non-prime factors;

means for initializing an Nmin parameter to a smallest factor from said mutually prime factors and said non-prime factors, and initializing an Index Correction (IndCor) to zero;

means for determining whether a value of 'k' is less than a value of 'n', wherein 'k' is a variable and 'n' corresponds to the number of said mutually prime factors;

means for determining whether a row number (i) of said PFA DFT is less than a Column increment index (Cincr) of said PFA DFT, wherein said Column increment index (Cincr) equals N divided by Lk (N/Lk), wherein Lk is the 'kth' mutually prime factor of said mutually prime factors, wherein a 0th column index Xi0 for an ith row of said PFA DFT is calculated in accordance with an equation:

$$Xi0=(i*Lk*M)\%N,$$

where M is the product of the non-prime factors;

means for calculating an index correction (IndCor) of said PFA DFT when a value of said Xi0 equals zero and when said row number (i) does not equal zero, wherein said IndCor is calculated to obtain a source mapping of linear indexes in accordance with an equation:

$$IndCor=(IndCor+N\min)\%(M-1),$$

wherein said Xij is calculated in accordance with an equation: Xij=Xij+IndCor, wherein said Xij represents the ith row and jth column of a 2-Dimensional input Buffer X, wherein said Xij enables a selection of said linear index from said 2D input buffer;

means for generating said plurality of data read indexes based on said mutually prime factors and said non-prime factors, wherein said plurality of data read indexes Xij are generated in accordance with an equation:

$$Xij=(Xi(j-1)+Cincr)\%N,$$

wherein each of said data read indexes is generated per stage to correspond to at least one of said mutually prime factors or at least one of said non-prime factors;

means for performing a DFT kernel computation on said Lk point for each of said mutually prime factors and each of said non-prime factors using said plurality of data read indexes that are generated and obtained from said 2D input buffer; and means for generating said plurality of data write indexes for said mutually prime factors and said non-prime factors, wherein said plurality of data write indexes are stored in an output buffer or an input buffer of a next stage.

2. The machine of claim 1, wherein said machine further comprises means for incrementing a value of 'j' when said Xij is calculated.

3. The machine of claim 2, wherein said machine further comprises means for determining whether said value of 'j' is less than said 'Lk'.

4. The machine of claim 1, wherein said machine further comprises means for incrementing said value of 'j' when said plurality of data read indexes are generated, wherein the value of said 'M' is the product of said non-prime factors.

5. The machine of claim 1, wherein the machine is a processor.

6. A machine configured to implement a set of instructions for faster generation of a plurality of pipelined data read indexes and a plurality of pipelined data write indexes for a Prime Factor Algorithm (PFA) based mixed radix Discrete Fourier Transform (DFT), said machine comprising:

means for factorizing an 'N' point PFA DFT into one or more mutually prime factors and zero or more non-prime factors;

means for initializing an Nmin parameter to a smallest mutually prime factor from said mutually prime factors, and initializing an Index Correction (IndCor) to zero;

means for determining whether a row number (i) of said PFA DFT is less than a Column increment index (Cincr) of said PFA DFT, wherein said Column increment index (Cincr) equals N divided by Lk (N/Lk), wherein a 0th column index Xi0 for an ith row is calculated in accordance with an equation:

$$Xi0=(i*Lk*M)\%N;$$

means for calculating an index correction (IndCor) of said PFA DFT when the value of said Xi0 equals zero and when said row number (i) does not equal zero, wherein said IndCor is calculated in accordance with an equation:

$$IndCor=(IndCor+N\min)\%(M-1),$$

wherein said Xij is calculated in accordance with an equation: Xij=Xij+IndCor;

means for generating said plurality of data read indexes based on said mutually prime factors and said non-prime factors, wherein said plurality of data read indexes are generated in accordance with an equation:

$$Xij=(Xi(j-1)+Cincr)\%N;$$

means for performing a DFT kernel computation on said Lk point for each of said mutually prime factors and each of said non-prime factors using said plurality of data read indexes that are generated and obtained from an input buffer; and means for generating said plurality of data write indexes for said mutually prime factors and said non-prime factors.

7. The machine of claim 6, wherein said machine further comprises means for incrementing a value of 'j' when said Xij is calculated.

8. The machine of claim 6, wherein said machine further comprises:

means for determining whether said value of 'j' is less than said 'Lk'; and means for incrementing said value of 'j when said plurality of data read indexes are generated.

9. The machine of claim 6, wherein the machine is a hardware accelerator.

10. A processor to dynamically configure a plurality of DFT stages in a communication system, said processor comprising:
- a factorization unit that factorizes an N point DFT into a plurality of mutually prime factors and a plurality of non-prime factors;
- a stage determination unit that determines a plurality of stages based on said mutually prime factors and said non-prime factors; and
- a stage configuration unit that dynamically configures said plurality of stages based on said mutually prime factors and said non-prime factors of said N point DFT.

11. The processor of claim 10, wherein said plurality of stages comprises a plurality of PFA stages and a plurality of Non-PFA stages.

12. The processor of claim 11, wherein said plurality of PFA stages and said plurality of Non-PFA stages are determined based on said N point DFT.

* * * * *